United States Patent [19]

Florey et al.

[11] Patent Number: 4,730,151
[45] Date of Patent: Mar. 8, 1988

[54] CONTINUOUS FIELD CONTROL OF SERIES WOUND MOTORS

[75] Inventors: Bernard I. Florey; Joe C. Lambert, both of Charlottesville, Va.

[73] Assignee: General Electric Company, Charlottesville, Va.

[21] Appl. No.: 819,071

[22] Filed: Jan. 15, 1986

[51] Int. Cl.$^4$ .............................................. H02P 3/14
[52] U.S. Cl. .................................... 318/376; 318/139; 318/363; 318/370; 318/373
[58] Field of Search ............... 318/139, 363, 366, 367, 318/370, 371, 373, 375, 376; 364/424

[56] References Cited

U.S. PATENT DOCUMENTS

| | | | |
|---|---|---|---|
| 3,755,724 | 8/1973 | Anderson | 318/139 |
| 3,826,959 | 7/1974 | Anderson | 318/139 |
| 4,124,812 | 11/1978 | Naito et al. | 318/367 X |
| 4,388,573 | 6/1983 | Horiuchi et al. | 318/376 X |
| 4,423,363 | 12/1983 | Clark et al. | 318/376 X |
| 4,454,503 | 6/1984 | Konard | 318/641 X |
| 4,518,902 | 5/1985 | Melocik et al. | 318/373 |

FOREIGN PATENT DOCUMENTS 2316237 10/1973 Fed. Rep. of Germany ...... 318/139

Primary Examiner—Bentsu Ro
Attorney, Agent, or Firm—Irving M. Freedman; James H. Beusse

[57] ABSTRACT

A method for operating an electronic control system for an operator controlled, electrically driven vehicle. The vehicle being powered by a direct current electric traction motor. The electronic control system includes a power source, a variable mark-space ratio power regulator responsive to a motor current command signal developed in response to the position of an accelerator, a direction selection means for providing signals indicative of the direction of motion of the vehicle, and a braking signal responsive to brake position. The electronic control system implements operation of the motor automatically in a propulsion mode, a regenerative mode, and a plug mode. The propulsion mode is either a series connected mode or a separately excited mode. The regenerative mode simulates the retarding effects of an internal combustion engine driven vehicle, while recover the kinetic energy of the vehicle by the generation of current to recharge the power source. The regenerative mode includes a regenertive coast mode and a regenerative brake mode. The plug mode provides a greater retarding force than the regenerative mode. The plug mode includes a plug coast mode and a plug brake mode.

30 Claims, 11 Drawing Figures

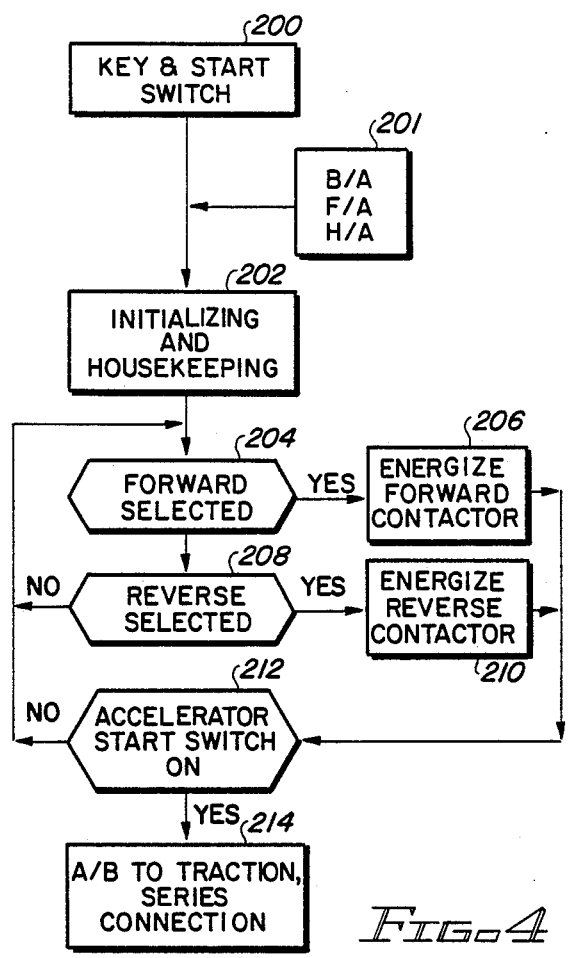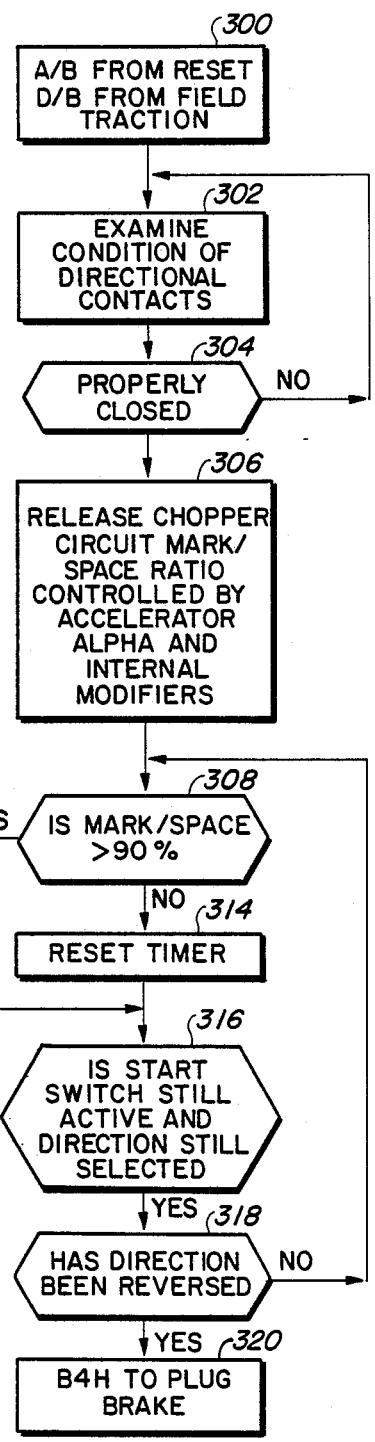

CONTINUOUS FIELD CONTROL OF SERIES WOUND MOTORS

FIELD OF THE INVENTION

The present invention relates to direct current electric motor controls and, more particularly, to a method and apparatus for regulating electrical braking current in a direct current electric traction motor.

BACKGROUND OF THE INVENTION

In electric vehicles powered by storage batteries and direct current (DC) series wound electric motors, i.e., motors with armature and field windings serially connected, particular characteristics of the motor make for excellent low speed maneuvering operation, as well as for strong low speed torque for lugging and acceleration. However, series connected motors make for less than ideal operation at higher speeds, and when using the motor for regenerative braking. In present day electric vehicles, electronic power regulators are used to control torque and speed developed by the electric traction motors. Typically, the regulator comprises a time-ratio or chopper circuit which varies the power developed by the motors by controlling the percentage of time that the motors are connected directly to the power source. For maximum mobility, the power source is usually a battery. The regulator also includes apparatus responsive to accelerator position for varying the percentage on-time or mark-space ratio of the chopper circuit.

The chopper type controls for these vehicles typically employ resistor field weakening involving shunting the field winding with a resistor at appropriate speed and torque load points. The resulting improvement in high speed operation is, at best, compromised and since a certain amount of energy is burned up in the field shunting resistor, there is also an attendant efficiency loss. Therefore, it is most advantageous to change to a separately excited field control mode for higher speed operation. When effecting such a change, it is important that the field current/armature current relationship be precisely controlled to avoid jerkiness.

An additional advantage of continuous separate field control over the nearest equivalent in series motor control relates to that of regenerative braking wherein the motor acts as a generator to deliver energy to the battery at times when the load overhauls the motor. In a separately excited motor, such an operating mode is a relatively straight forward controllable process. A series generator, although practical, presents problems in regards to precise control.

In order to reduce the rate of wear on mechanical brakes in electric vehicles it is common practice to implement some form of electrical braking. In a series connected motor, electrical braking may be either dynamic or plug braking. In either case, the field and armature connections are reversed and armature current is dissipated in shunt resistors (dynamic brake) or in the armature itself (plug brake). The tractive effort is modulated by the chopper control so as not to overstress the electrical or mechanical components, as well as the operator and load, and to provide a set level of retarding torque. This method, while very effective in controlling braking of the vehicle, recovers none of the kinetic energy of the system and also takes a heavy toll on operating components, particularly the drive motor, from heavy current dissipation.

Regulation to a desired braking torque under these conditions tends to be inefficient since the armature current is so large with respect to field current that armature reaction disturbs the normal field flux control of the armature circuit. Because a low level of field current excitation at the higher motor speeds produces very large magnitudes of armature current, the control of plugging becomes relatively critical.

On the other hand, regenerative braking works well at a high kinetic energy state, when the vehicle velocity is high, but rapidly looses its effectiveness as speed decreases. Even though regenerative braking can be maintained down to near zero speed, effective braking torque diminishes to a point where auxiliary braking is needed in a practical case. This point occurs at around half base speed or when three-fourths of kinetic energy has been expended. From this point more effective electrical braking can be obtained from plugging.

The problem to be solved in this instance is to provide a system in which the motor can be connected to provide braking torque in the regenerative, separately excited mode at higher motor speeds and to switch to a plugging mode when braking torque requirement exceeds that obtainable from the regenerative connection, i.e., as speed drops, the transitions being as transparent to the vehicle operator as practical.

Another characteristic often observed in electrical vehicles is that during normal travel, when the operator moves his foot from the accelerator, the vehicle coasts with little or no retarding force such as that experienced that internal combustion engine driven vehicles. Although it is desirable for an operator to experience the same vehicle "feel" when operating either an electric vehicle or an internal combustion engine driven vehicle, implementation of retarding torque in a coast mode requires more complex circuitry and has not generally been available in electric vehicles.

An increasingly important operating capability in industrial vehicles is to limit travel speed due to operating environment or situations such as, for example, raised loads, hazardous areas, floor conditions, turning angle, etc. Typical speed governing methods presently in use tend toward limiting an accelerator command signal usually by mechanical travel restriction, and/or electrical override. While providing a measure of speed limiting, the gradability and load carrying capability is often affected adversely. Additionally, such methods provide little, if any, speed limiting when overhauling (down grade) operation is encountered.

It is an object of the present invention to provide speed limiting characteristics in an electric vehicle with little or no load handling and gradability deterioration, and with speed control equally effective with light and/or overhauling loads.

It is an object of the present invention to provide a simplified control circuit for implementing a retarding torque function in an electric motor driven vehicle when an accelerator is released, including enhancing retarding torque as a function of mechanial/hydraulic service brake pedal position.

It is another object of this invention to provide an electric vehicle control system implementing braking torque in a regenerative, separate excited mode, which system will switch to a plugging mode when braking torque requirement exceeds that obtainable from the regenerative connection, the transitions being substantially transparent to a vehicle operator.

It is further object of this invention to provide an electric vehicle control system in which an electric motor is configured to operate in a series mode at its most advantageous characteristic during starting and maneuvering and change to a separately excited, field control mode at higher speed, such that the field/armature current relationship is precisely controlled, allowing operation at higher speed torque point than is possible to obtain from the series motor connection.

It is yet another object of this invention to provide the coast characteristics of an internal combustion engine driven vehicle in an electric vehicle.

SUMMARY OF THE INVENTION

A current regulator is implemented in a microcomputer control system in which a switching regulator operating in a time ratio control mode regulates the current to a direct current electric traction motor. The operation of the electric vehicle starting from rest begins in a series controlled mode operation, i.e., armature and field electrically connected in series. The motor is operated in the series mode at its most advantageous characteristic and changes to a separately excited field control mode in the operating region when it is most advantageous to do so and, more particularly, in such a way that the field current/armature current relationship can be precisely controlled.

When electrical braking is desired, the control system terminates gating signals to the switching regulator and automatically transitions to the braking mode in which the ratio of conducting to nonconducting time of the switching regulator is immediately set at a very low percent. If the motor is operating in a series mode and coasting or electrical braking is commanded, the microcomputer control system terminates the motoring operation and begins a plug mode coast operation or a plug mode brake operation, respectively. If the motor is operating in a separately excited field control mode and coasting or electrical braking is commanded, the microcomputer system initiates a regenerative coast mode or a regenerative braking mode, respectively. From the regenerative coast mode, unless a variable braking option is utilized, the microcomputer selects either the plug coast mode or the regenerative braking mode depending upon the advantageous characteristics of each mode. If the variable braking option is available, the system remains in regenerative coast until mechanical braking is initialized to bring the electric vehicle to rest. From the regenerative braking mode and the plug coast mode, the microcomputer switches the system to either plug mode braking or power off. It is obvious that other combinations or options are practical such as allowing free coast with regenerative and plug braking applied upon application of brake pedal. If at any time the operator decides to switch from braking operation to an accelerating operation, the microcomputer system will selectively switch to either the series or separately excited traction mode, as a function of braking mode, i.e. if in regeneration, field control is selected, and if in plug, series connection is selected.

DESCRIPTION OF THE DRAWINGS

For a better understanding of the present invention, reference may be had to the following detailed description taken in conjunction with the accompanying drawings in which:

FIG. 4 is a detailed functional diagram of the reset mode for the motor control circuit;

FIG. 5 is a detailed functional diagram of the series control traction mode;

DETAILED DESCRIPTION OF AN ILLUSTRATIVE EMBODIMENT

1. Motor Control Circuit

Figure 1:
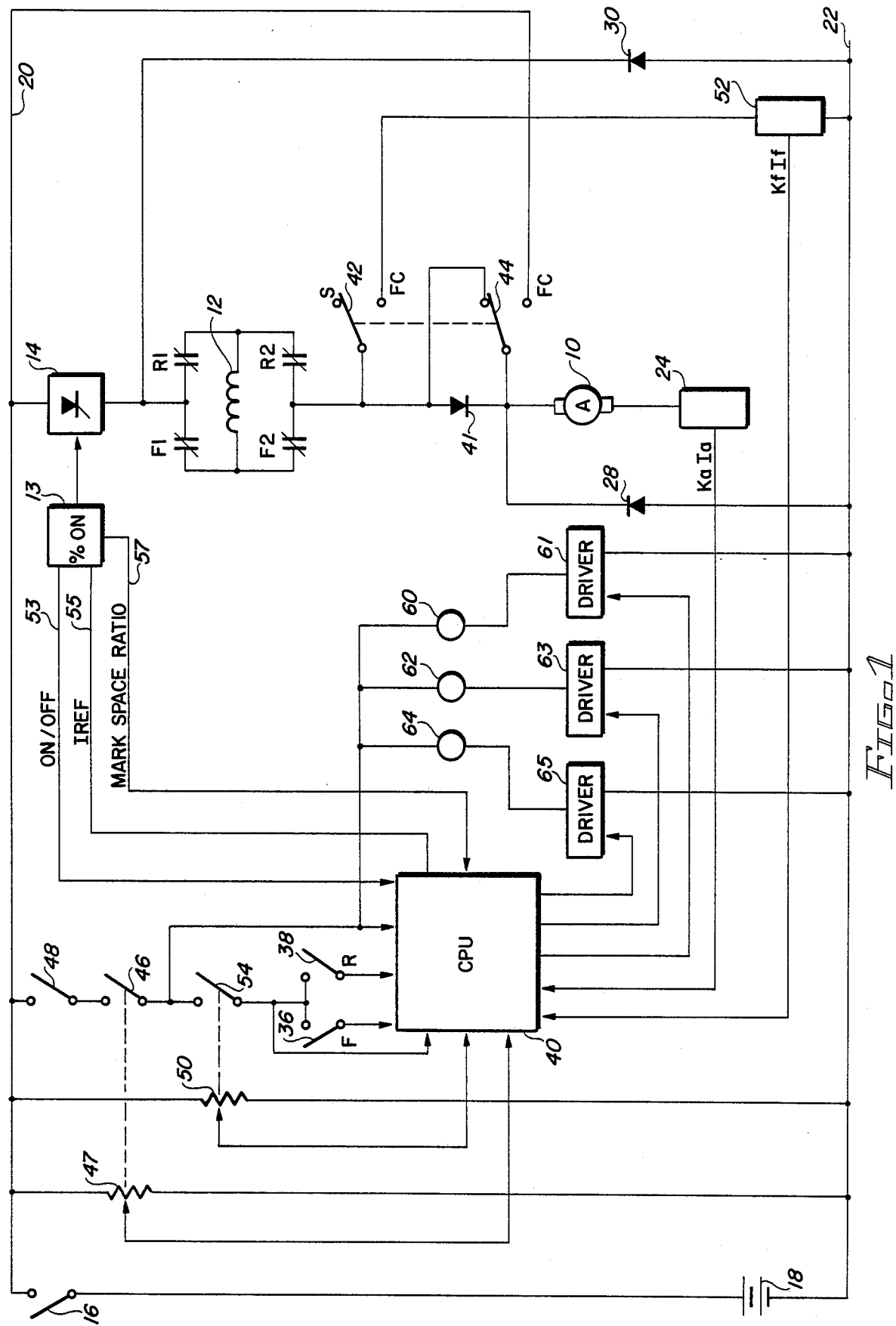
FIG. 1 is a detailed circuit diagram of the motor control circuit of the present invention.

In FIG. 1, there is illustrated a preferred implementation of the invention using a microcomputer based control system. A DC motor comprising an armature winding 10 and a field winding 12, is supplied with electrical power via a chopper circuit 14 and a key switch 16 which serve to connect the motor across a power source 18, such as a battery. The mark-space ratio of the chopper circuit 14 is controlled by a chopper control unit 13. Preferably, chopper circuit 14 comprises a silicon control rectifier (SCR) chopper circuit including a controllable commutation circuit and associated commutating capacitor. A typical chopper circuit is shown in U.S. Pat. No. 3,826,959 issued July 30, 1974 and assigned to General Electric Company. The chopper circuit 14 is connected in series with the armature winding 10 and the field winding 12 between a positive bus 20 and the field winding 12. The field winding 12 is connected to the armature winding 10 which is connected to a negative bus 22 connected to the battery 18.

The motor field winding 12 is arranged to be connected in either a forward or a reverse direction by means of a plurality of contacts F1, F2, R1 and R2. A current shunt 24 is connected between the armature winding 10 and the negative bus 22 of the battery to provide a signal indicative of the magnitude of armature current. The motor power circuit also includes a plugging diode 28 connected between the bus 22 and a junction intermediate the motor armature 10 and field winding 12. The plugging diode 28 provides a reverse current path during plug mode electrical braking. A freewheeling diode 30 is connected between the bus 22 and a junction intermediate field winding 12 and the power regulator or chopper circuit 14. The free-wheeling diode 30 is utilized to provide a current path for the inductive motor current when the chopepr circuit 14 is not conductive.

Connected between field winding 12 and armature winding 10 is a switch 44 and a switch 42. Switch 42 and switch 44 are mechanically coupled together such that a movement in one produces a corresponding movement in the other. The switches determine a series mode operation for the motor versus a separatedly excited or field control mode operation for the motor. When switch 42 and switch 44 are switched into the "S" position the motor is in a series mode in which the field winding 12 and motor armature 10 are connected in series. When switch 42 and switch 44 are switched to the "FC" position the motor is in a separately excited or field control mode in which the field winding 12 is connected in series with the chopper circuit 14, and motor armature 10 is connected across battery 18, with current shunt 24 remaining in series to sense armature current. Switching of switch 42 and switch 44 is controlled by coil 60. A diode 41 prevents any arcing when the switches 42 and 44 are switched. A current shunt 52 is connected between the "FC" position of switch 42 and the negative power bus 22 to provide a signal indicative of the magnitude of the field winding current during operation of the motor in the separately excited mode.

In the series mode, a DC motor is capable of developing a high torque which, at zero speeds is ideally suited for starting heavy loads. The series connected motor also is capable of providing torque over a wide speed range. A drooping characteristic, which causes the motor to slow down when subject to high torque loads, provides a favorable power demand which does not rise in proportion to torque. In the series mode the series motor is not normally well suited for uniform speeds required over a wide range of loads. Therefore, a separately excited mode or field control mode which changes speed only slightly with load is best suited for such application. Since speed cannot be controlled without the addition of an armature chopper at low speeds, the separately excited mode is undesirable for starting heavy loads. Thus, switch 42 and switch 44 provide a means to the desirable characteristics of both the series and separately excited motor.

The forward and reverse contacts F1, F2, R1 and R2 about field winding 12 are controlled by a microcomputer 40 from the position of the forward and reverse contactors 36 and 38, respectively. The forward and reverse switches 36 and 38 are connected between power bus 20 and microcomputer 40 by means of a seat switch 48, a brake switch 46, and a start switch 54. The seat switch 48 essentially acts as a dead man switch such that when the operator vacates the seat on the electric vehicle, the electric vehicle is immediately stopped by action of the microcomputer 40. Swich 48 also prevents starting of the electric vehicle with no operator in the seat.

The control functions are implemented in a microcomputer 40 which includes the necessary hardware such as counters, registers and memory units for performing those functions described. The microcomputer 40 is connected to perform selected safety checks by monitoring the status of the seat switch 48, the brake switch 46, the start switch 54 and the forward and reverse direction contactors 36 and 38. The brake switch 46 is energized by depressing the brake pedal. In one form, a potentiometer 47 may be mechanically attached to the braking mechanism. When the braking mechanism, such as a pedal, is depressed, the potentiometer 47 measures the amount of depression and provides a signal to the microcomputer 40.

Accelerator 50 also provides an input signal indicative of the percent accelerator pedal depression to the microcomputer 40. The percent depression of the pedal is herein after referred to as ALPHA. The accelerator is mechanically coupled to a start switch 54. When the accelerator is depressed the start switch is energized which provides a signal to the microcomputer 40. The signal indicates that the operator has depressed the pedal and desires the electric vehicle to start. The motor armature current sensing is provided by sensor 24 connected in series between the motor armature 10 and negative power bus 22. Regenerated braking current, that which is generated in reverse direction so as to recharge the battery 18, is sensed by sensor 24. Field control current sensing is provided by a sensor 52 connected in series with field winding 12 and chopper circuit 14 when contactors 42 and 44 are in the FC position.

The field winding 12 is arranged to be connected in either a forward or reverse direction in series with motor armature 10, where forward and reverse refer to the direction of the rotation of the motor armature 10, by means of contacts F1, F2, R1, and R2 which are shown in the normal de-energized state. Control of contact F1 and F2 is through a contactor actuating coil 62 while contacts R1 and R2 are controlled by a contactor actuating coil 64. The coils 62 and 64 are connected across the battery 10 by means of respective contactor driver circuits 63 and 65. The driver circuits 61, 63, and 65 may be in the form illustrated in co-pending application Ser. No. 299,047 filed Sept. 3, 1981 now U.S. Pat. No. 4,457,503 assigned to General Electric Company.

The coils 60, 62, and 64 are controlled respectively by driver circuits 61, 63, and 65. The driver circuits are activated by commands from the microcomputer 40. For example, when the system switches from series mode to field control mode, the microcomputer 40 activates driver 61 which energizes coil 60. The energization of coil 60 activates the switching of switch 42 and switch 44 from the "S" position to the "FC" position.

Microcomputer 40 drives the chopper control unit 13 through an on-off signal, 53 and a current reference signal 55 in a manner well known in the art. The microcomputer 40 senses the mark-space ratio developed by the chopper control unit 13 via line 57. The chopper control unit 13 provides the necessary activation signals to the chopper circuit 14 to control motor current primarily in response to monitored operator input commands. The operator input commands include the activation of the start switch 54, the accelerator 50 pedal travel, the brake 47 pedal travel (if the potentiometer 47 is utilized), the operator position of the forward switch 36 and reverse switch 38, the status of the seat switch 48, and the brake switch 46. The microcomputer 40 responds to the operator input commands by activating the appropriate switches and contacts and by providing control signals to the mark-space ratio chopper control unit 13 which in turn determines the duty cycle or ratio of on-time to off-time of chopper circuit 14. The duty cycle of chopper circuit 14 determines the current through the motor windings 10 and 12. In addition, notable is the fact that in changing positions of the forward switch 36 and reverse switch 38, a neutral signal is always generated by the microcomputer 40 when a change in direction (i.e. electrical braking) is called for.

2. Microcomputer Control

Figure 2:
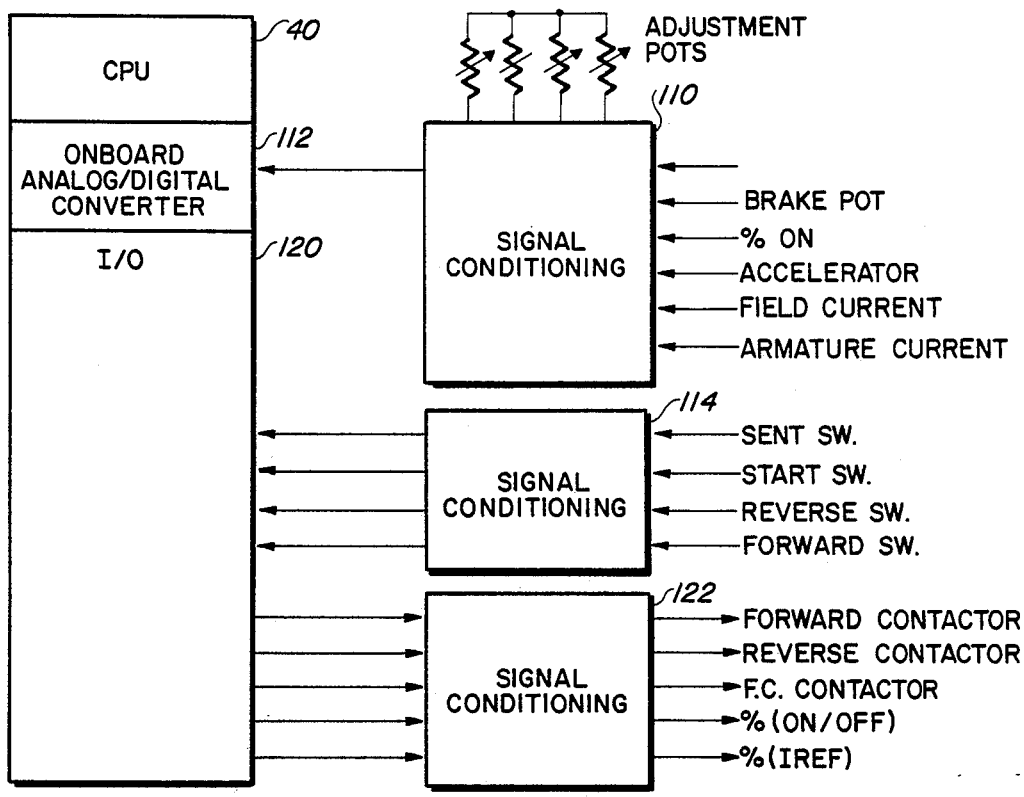
FIG. 2 shows the input/output configuration of the microcomputer system.

Referring now to FIG. 2, the microcomputer 40 is shown in more detail. A microcomputer 40 is coupled by way of an internal address bus and an internal data bus to an analog to digital converter 112 and an input/output unit 120, in a manner well known in the art. The analog to digital converter 112 converts analog signals to binary data for use by microcomputer 40. The input/output interface 120 contains the necessary hardware and logic to read binary data and output binary data. The microcomputer 40 preferably comprises a type 6805 microprocessor available from Motorola.

A first signal conditioning circuit 110 is connected to receive the armature current signal from sensor 24, the field current signal from the separately excited field current sensor 52, the accelerator position signal, the brake position signal, the mark space ratio signal from the markspace ratio unit 13, and various current limiting signals. The signals are transferred to the microcomputer 40 by a signal multiplexer in the signal conditioning circuit 110 to the analog to digital converter 112 contained within the microprocessor 40. A second signal conditioning circuit 114 provides an interface between microcomputer 40 and those system signals which are of a binary nature, i.e., those signals which represent a switch being open or closed. As illustrated, the signal conditioning circuit 14 monitors the status of the seat switch 48, brake switch 46, start switch 54, forward directional switch 36 and reverse directional switch 38.

Command signals developed by the microcomputer 40 are coupled through the I/O interface 120 (which contains a digital to analog converter) and signal conditioner 122 to the forward contactor drive circuit 63, the reverse contactor drive circuit 65, the series mode and field control mode driver 61, and the switching devices within regulation circuit 13. The signal conditioning circuit 122 is a driver amplifier level shifting circuit of a type well known in the art.

3. General Description of Functional Status of Motor Control Circuit

Figure 3:
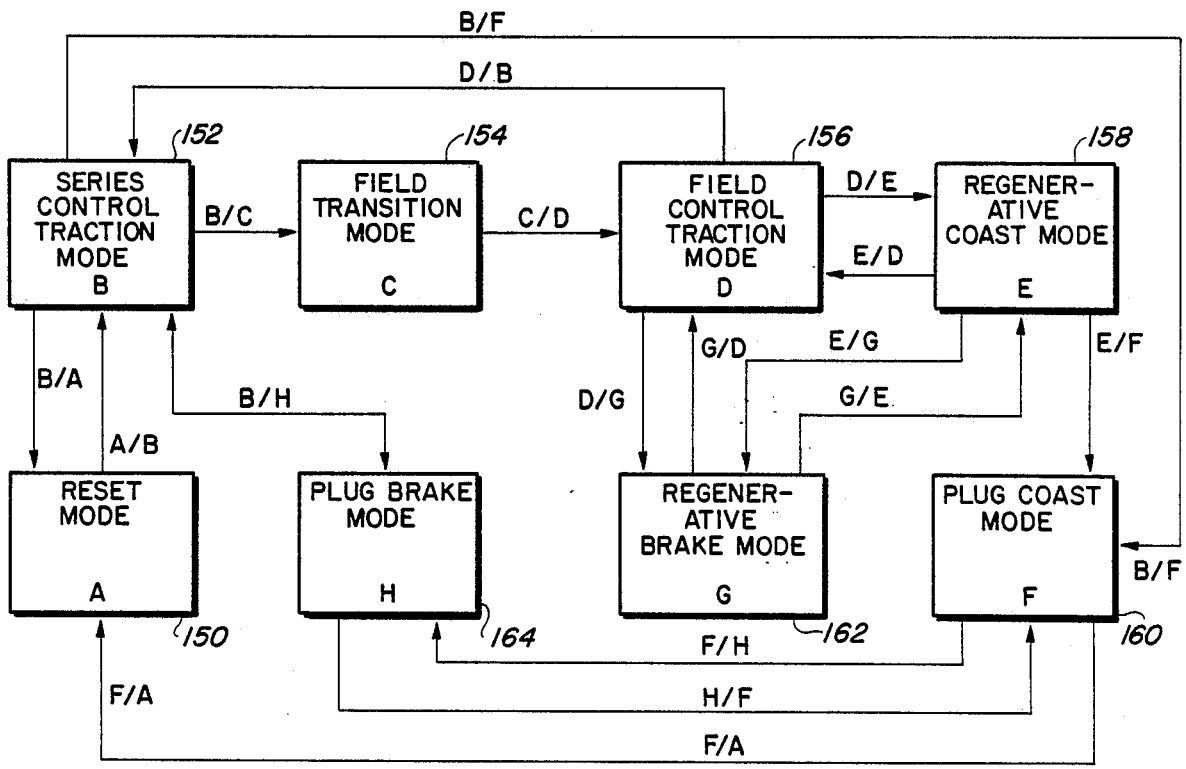
FIG. 3 is a general schematic of the functional states of the motor control circuits.

Operation of the control system of FIG. 1 is shown in FIG. 3. FIG. 3 represents the functional states of the motor control system. For clarity the states have been labeled A through H. A line from one state to another state shows an allowable transition from one state to another state. The lines are labeled with the beginning state/ending state. For example, a transfer from state D to state G is labeled as D/G. A transition from state F to state A is labeled as F/A. If a line does not exist between two states, a transition is not allowed.

State A represents the reset mode 150. In this mode all the circuitry is initialized in preparation of the operator selecting a direction in initiating tractive effort of the vehicle. State B is the series control traction mode 152. In this mode the drive motor is connected to the power source in a series connection with the field orientated to produce torque in the selected direction. State C is the field transition mode 154. This mode causes reconnection of the motor from series connection to separately excited field connection. State D represents the field traction control mode 156. In the field control traction mode 156 the field current is specifically controlled by the mark-space ratio of the chopper circuit. The armature is connected directly across the battery. The armature current is determined by the load conditions and the field strength generated by the field current.

State E represents the regenerative coast mode 158. This mode causes a retarding torque to be applied by increasing the field excitation current over that current necessary to maintain motion in the direction selected and the speed selected by the accelerator. State F corresponds to the plug coast mode 160. The plug coast mode 160 provides further retarding torque action beyond that available from regenerative coasting.

State G is the regenerative brake mode 162. The regenerative brake mode 162 provides strong braking action when the operator selects a direction opposite to that being travelled. State H is the plug brake mode 164. The plug brake mode 164 provides strong braking action when the operator selects direction opposite to that being travelled, with the intention to reduce vehicle speed to zero, and ultimately to reaccelerate in the opposite direction.

Briefly, state A is when the vehicle is at rest. State C is a transition mode between states B and D which are traction modes. States E and G are regenerative modes which recover the kinetic energy of the vehicle by recharging the power source. States F and H are plug modes which provide electrical braking.

During normal running operation the vehicle is initially at rest. At this time switches 42 and 44 in the de-energized state are in the series mode. The vehicle control is in neutral and there is no duty cycle output from microcomputer 40 to the mark-space ratio chopper control unit 13 for chopper circuit 14. By the operator activating the key switch 16 or the seat switch 48, the motor control system is put into the reset mode (state A) 150. Through an operator's input command for direction, switch 36 or 38 is directed to be in a position to activate forward contactor coil 62 or reverse contactor coil 64 through the appropriate driver interface. A second operator input command, depressing the accelerator pedal and activating the start switch 54 (e.g. from an accelerator pedal), applied to the signal conditioning circuit 110, determines the motor rotational speed and power. The microcomputer 40, in response to the second operator input command, determines the percent on time control to the mark-space ratio chopper control unit 13 which determines the duty cycle of chopper circuit 14 in response to the operator's command. This corresponds to a transition from the reset mode 150 to the series traction mode 160. This transition is labeled as A/B as shown in FIG. 3. When the vehicle reaches the running condition where the mark-space ratio is typically 90 percent or higher for a preselected period of time (typically one second), the control will transfer to the field transition mode 154 (B/C) in route to the field control traction mode 156 (C/D). Other conditions for transition from the series traction mode 152 to other modes are based upon the operator action to discontinue tractive motion in the chosen direction and moving to stopping, coasting or reversing selected direction.

The first condition is when the operator switches the forward or reverse switches into neutral or the operator releases the accelerator pedal opening the start switch 54 and the mark-space ratio supplied by the chopper circuit 14 is greater than a predetermined percent, typically 30 percent. On this condition, the microcomputer 40 switches the motor control circuit to the plug coast mode 160 (B/F). If the mark-space ratio is less than the predetermined percent, the microcomputer 40 transitions the motor control circuit to the reset mode 150 (B/A).

The second condition that may occur, is the operator selecting the opposite direction. On this occurrence, the microcomputer 40 forces the motor control circuit into a plug brake mode 164 (B/H).

Assuming that the necessary conditions have arisen to switch the motor control circuit to the field transition mode 154 (B/C), the motor control circuit will eventually switch to the field control traction mode 156 (C/D). In the field control traction mode 156 there are three conditions in which the microcomputer 40 determines whether the motor control circuitry terminates the field control traction mode 156. If ALPHA (percent pedal depression) is less than 67 percent or with auto plug option active, ALPHA is less than 67 percent for a preselected time period, e.g., 0.2 seconds, then the microcomputer 40 switches to the series control traction mode 152 (D/B). In the field control traction mode 156, if the operator puts the electric vehicle in neutral or releases the pedal which opens the start switch 54, the microcomputer 40 switches to a regenerative coast mode 158 (D/E). If the opposite direction is selected, then the motor control circuit switches to the regenerative braking mode 162 (D/G).

There are four electrical braking modes that essentially produce different retarding forces. They are regenerative coast mode 158, plug coast mode 160, regenerative braking mode 162 and plug brake mode 164. Regenerative coast mode 158 and plug coast mode 160 have less retarding force respectively, than regenerative braking mode 162 and plug braking mode 164. The regenerative coast mode 158 is less electrical braking or retarding force than the regenerative brake mode 162. The regenerative coast mode retarding force is similar to the release in the pressure on the accelerator in an automobile.

When the microcomputer 40 switches to the regenerative coast mode 158 from the field control traction mode 156, it increases the field current causing armature voltage to rise, driving current in the reverse direction. This causes the motor to act as a generator to charge the battery. The motor control circuit transfer to another mode from the regenerative coast mode 158 by a change in directional selection, release of brake, reapplication of accelerator, or if the retarding torque is continued. If there is a change in directional selection, the microcomputer 40 switches the motor control circuit to the regenerative brake mode 162 (E/G). Reapplication of the accelerator causes the microcomputer 40 to switch from the regenerative coast mode 158 to the field control traction mode 156 (E/D).

It is obvious that regenerative coasting or braking is a preferred method to use when the power source is capable of accepting the regenerative energy and the retarding torque available satisfies the operators demand. As is well known, the voltage developed by the electric motor is a function of the motor field current in the armature rotational velocity and the battery terminal voltage. Accordingly, as the vehicle's speed is reduced, the ability of the electric motor to regenerate energy is also reduced. At some speed, the regenerative coast mode 158 is terminated and some form of plug braking or mechanical braking initiated. In the regenerative coast mode 158, the motor control circuit stays in regenerative coast mode 158 as long as the directional switch is in neutral or the start switch is open and armature current is above a predetermined value ($I_{coast}$) set by a current limitation potentiometer. When the armature current falls below $I_{coast}$, the microcomputer 40 forces a transition from the regenerative coast mode 158 to the plug coast mode 160 (E/F).

In the plug coast mode 160, the microcomputer 40 can switch to either the plug brake mode 164 or back to the reset mode 150. If there is a change in directional selection and the start switch is active, the microcomputer switches from the plug coast mode 160 to the plug brake mode 164 (F/H). Otherwise the microcomputer 40 switches from the plug coast mode 164 to the reset mode 150 (F/A).

The regenerative brake mode 162 provides strong braking action when the operator selects a direction opposite to that being travelled with the intention to reduce vehicle speed to zero and ultimately to reaccelerate in the opposite direction, in such a way as to recover a portion of the vehicle kinetic energy as a battery charge. The microcomputer switches from the regenerative brake mode 162 to the plug brake mode 164 (G/H) when the vehicle speed drops to approximately half full speed, below which plug braking becomes more effective. When the vehicle speed is near zero, the microcomputer switches from the plug brake mode 164 to the reset mode 150 (H/A) in preparation to vehicle accelerating in the opposite direction. If the operator removes his foot from the accelerator pedal to coast in plug mode, the microcomputer switches to the plug coast mode 160 (H/F).

In the regenerative brake mode 162, if the operator selects the opposite direction again, the microcomputer forces transition to the field control transition mode 156 (G/D). If the operator in regenerative brake mode 162, activates the brake pedal, start switch or neutral, the microcomputer forces transition to the regenerative coast mode 158 (G/E).

For a better understanding of the functional cooperation of the modes described briefly above, attention is directed to FIGS. 4 through 11 of the drawings wherein the respective modes are discussed and illustrated in detail.

4. Detailed Description of the Motor Control Circuit Modes

A. Reset Mode

Before the microcomputer transfers the motor control circuit to the reset mode, all the contacts on the motor control circuit are de-energized. When the operator enables the key switch 16 and any interlock such as the seat switch 48, the motor control circuitry begins sensing for operator action indicating the desire to cause vehicle motion. Referring to FIG. 4, there is shown a detailed functional diagram of the operation of the motor control circuit in the reset mode. When the key switch 16 and seat switch 48 are activated by the operator, the microcomputer initializes the controlling inputs and timing flags, block 200. In addition, the reset mode can be entered via the series control traction mode, the plug brake mode, and the plug coast mode, block 201. The microcomputer then begins scanning the conditions of the controlling inputs to determine any action by the operator, block 202. Block 204 corresponds to the operator selecting the forward direction. If the operator selects the forward direction, the microcomputer energizes the forward contactor 36, block 206. The other action that can be taken by the operator is selecting the reverse direction, block 208. Upon the operator selecting the reverse direction, the microcomputer energizes the reverse contactor 38, block 210. After selecting a direction, the operator commences vehicle motion depressing the accelerator and enabling the start switch 54, as shown in step 212. Upon determining that a direction is selected by the operator and the accelerator is depressed and all interlocks remain inactive, the microcomputer transfers from the reset mode to the series traction mode (A/B), block 214.

B. Series Control Traction Mode

The objective of the series traction mode is to connect the drive motor to the power source in a series connection. The series connection is connected with the field orientated to produce torque in the selected direction, and controlled in the terminal voltage by the mark-space ratio chopper control unit 13. The series control traction mode can be entered from the reset mode or the field control traction mode. The initial conditions of the series control mode, are the forward/reverse field connectors are de-energized and the mark-space ratio chopper control unit 13 is inactive. Upon selection of direction and activation of the accelerator, the corresponding directional contact is energized. Appropriate checks are made for proper operation and circuit completion of the energized directional contactor. The chopper circuit is activated by the mark-space ratio unit with preselected control acceleration and currents limits imposed. The action of the chopper circuit in this mode is according to conventional practice well established in the field of series motor control. When the electric vehicle reaches running conditions where the markspace ratio is typically 90 percent or higher for a preselected period of time, typically one second, the microcomputer forces transition of the motor control circuit transfer to the field transition mode. Other conditions for exit to other modes are based upon the operator action to discontinue tractive motion in a chosen direction and stopping, coasting or reversing selected direction for braking.

Referring to FIG. 5, there is shown a detailed functional diagram of the series control traction mode. The series control traction mode is entered from the reset mode or the field control traction mode, block 300. The microcomputer senses the condition of the directional contactors 36 and 38, block 302. If the directional contactors are not properly closed, the microcomputer waits until detecting a proper closure on the directional contactors, block 304. During this time the microcomputer switches the motor control circuit into the series mode by connecting switches 42 and 44 to the S position. With the switches in this position, the field winding is in series with the armature and the motor operates in the series mode. When the accelerator pedal is depressed, the torque increases with the rate of torque increase dictated by the controlled accelerator characteristic of the chopper circuit 14, until its mark-space ratio reaches a value proportional to pedal depression, or optionally, reaches a value necessary to maintain a current proportional to pedal depressions, as shown in block 306. The motor will stay in the series control traction mode until one of four conditions appear.

As shown in block 308, microcomputer checks the mark-space ratio signal 57 determining whether the mark-space ratio is greater than 90 percent. If the mark-space ratio is greater than 90 percent, a one second timer is checked for activity, block 310. If the one second timer has not been started, the microcomputer starts the timer as shown in block 311. The microcomputer then resolves whether the timer has expired in block 312. If the timer has expired, the microcomputer begins transition to the field transition mode, block 314. If the timer has not expired, the microcomputer checks whether the start switch is still active and the same direction is still selected, block 316. The timer is used to delay transition to the field control traction mode. This may occur where the operator depresses the accelerator pedal and then releases pressure on the accelerator.

If the mark-space ratio is less than 90 percent, as shown in block 308, the microcomputer resets the one second timer, in block 314. If the start switch is still active and direction is still directed, block 316, the microcomputer senses whether the direction switches 36 and 38 are reversed, block 318. Reversing the direction signifies that the operator desires a strong retarding force for electrical braking of the motor. The operator initiates this braking by selection of the opposite direction (forward/reverse lever operation). In this case, the microcomputer causes transition to the plug coast mode, block 320. If the operator has not selected a different direction, the procedure loops back to determine whether the mark-space ratio has reached 90 percent, block 308.

If the operator desires to coast, he deactivates the start switch 54 or places the directional lever into neutral. The microcomputer then resolves whether the mark-space ratio is less than 30 percent, block 322. If the mark-space ratio is less than 30 percent, the microcomputer transitions the motor control circuit to the reset mode, block 324. If the mark-space ratio is greater than 30 percent and the plug coast mode option is available on this particular vehicle, the microcomputer transitions the motor control circuit to the plug coast mode, block 326.

C. Field Transition Mode

The objective of the field transition mode is to cause reconnection of the motor from the series connection to the separately excited field connection, such that the armature is connected across the battery. The field is connected across the battery through the chopper circuit, so that its excitation is determined by the mark-space ratio of the chopper circuit to minimize torque transition bump at changeover.

When the switches 44 and 42 are switched to the separately excited mode, the armature circuit may exhibit a jump because the armature is placed directly across the battery. Compensation for the jump or bump at changeover in the armature current is accomplished by overexciting the field current to bring the armature current down. The sensation the operator feels in operating an electric vehicle is about the same as a shift in the automatic transmission of an automobile. The compensation in the overexcited field is generated by the microcomputer 40 detecting currents of the field control sensor 52. This generates a changeover signal in the microcomputer. The changeover signal causes the microcomputer to sample the armature current via armature current sensor 24 and multiply the armature current by an emperically derived factor based on field inductance, armature inductance, and chopper circuit response. In practice, this factor is approximately 1.12. Using this calculation, a spike field current control command ($I_f^*$) is generated in the microcomputer during field transition which is sent to the chopper circuit 14. The overexcitation of the field brings the armature current down and the operator experiences shifts such as that of an automatic transmission of an automobile. Field current is then continuously regulated to restore armature current to equal field current.

At the instant of changeover, the armature current ($I_a$) and the field current ($I_f$) are equal, being connected in series. Immediately after reconnection, the mark-space ratio is increased to a higher value, the objective being to raise ($I_f$) quickly to achieve a condition where ($I_a$) equals ($I_f$), and both become equal to the current level of the series connected motor and the instant of changeover.

This method of transition is employed to minimize torque bump. When the controller reaches equalibrium of ($I_a$) and ($I_f$) at the required level, the control is transferred to the field control traction mode.

At the instant just after changeover, armature current, $I_a$, is determined by:

$$I_a(t_0+) = (E_{batt} - E_{arm} - (L_{arm} \times dI_a/dt))/R_{arm}$$

Where $R_{arm}$ is the armature resistance and $E_{arm}$ is the counter electromotive force of the armature as given by:

$$E_{arm} = (K_v) \times (w) \times (K_f) \times (I_f)$$

Where the product $K_f$ and $I_f$ represents the field flux, w represents the angular speed of the armature, and $K_v$ represents the voltage constant of the armature.

Since the armature current, $I_a$, just prior to the instant of changeover is given by:

$$I_a(t_0-) = ((E_{batt}) \times (\text{Mark-space ratio}) - (E_{arm}))/((R_{arm}) + (R_{field})),$$

it is clear that $I_a$ tends to rise after changeover because the battery voltage is no longer modified by the mark-space ratio of the chopper circuit, and the ohmic resistance of the field, $R_{field}$, is removed from the armature circuit.

In the separately excited connection, the only means to reduce the armature current and keep it under control is to increase $I_f$, the field excitation current, so as to increase the counter emf, $E_{arm}$.

The program continually monitors the values of $I_a$ and $I_f$, and at changeover, will adjust the markspace ratio of the chopper circuit, now connected only to the field circuit, to increase the field current according to:

$$I_f(t) = I_{fm} - [(I_{fm} - I_{f(t_0-)}) \times (e) \exp(-t/T_f)]$$

where $I_{f(t)}$ equals field current as a function of time (t) after changeover, $I_{fm}$ equals $E_{batt}$ x markspace ratio/$R_{field}$ which equals the asymptotic value of field current ($I_f$), $I_{f(t_0-)}$ equals field current value at changeover, $T_f$ equals $L_{field}/R_{field}$ which is the field winding time constant; and e is the natural log base.

The mark-space ratio at changeover is adjusted to a pre-selected value determined from motor parameters and circuit response, to provide optimum achievement of equilibrium of $I_a$ and $I_f$ at the value just prior to changeover $I_{f(t_0-)}$. As $I_a/I_f$ equilibrium is achieved the control is transferred to the "Traction, Field Control" mode.

Figure 6:
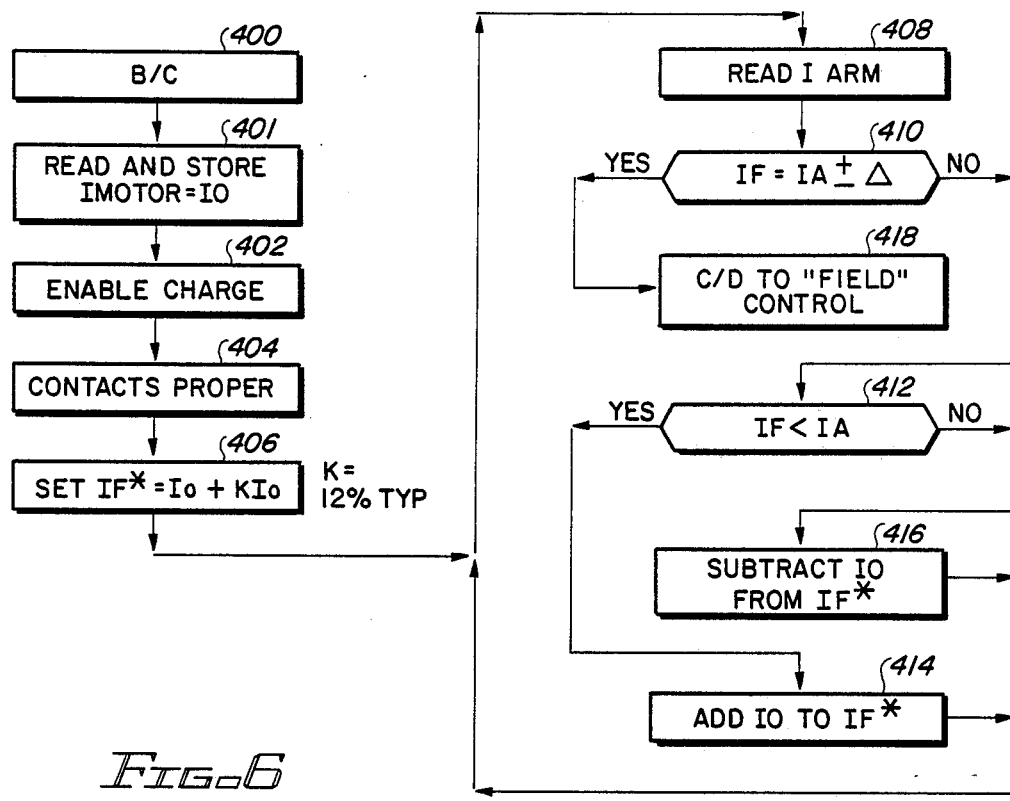
FIG. 6 is a detailed functional diagram of the field transition mode.

As illustrated in the flow chart of FIG. 6, the microcomputer in response to the transfer condition from the series control traction mode commands connection changeover to the field transition mode, block 400. In block 401, the microcomputer reads and stores the motor current $I_o$. This is the current for the motor in the series connection. At block 402, the microcomputer enables the change from the series mode to the separately excited mode. This corresponds to switches 42 and 44 moving from the S position to the FC position. The microcomputer then determines if the contacts are in the proper position, as shown in block 404.

The microcomputer then sets the field current command value ($I_f^*$) equal to the motor current plus an empirical constant times the motor current, block 406.

The field current command value is the value the field current is overexcited to bring the armature current down to compensate for the jump in the armature current. The microcomputer then reads the armature current through the armature current sensor 24, block 408. In block 410, it is determined whether the field current is equal to the armature current plus or minus a tolerance level. The tolerance band is the tolerance between ($I_a$) and ($I_f$) in equilibrium to achieve transfer to the field control traction mode. If this ($I_f$) is not equal to ($I_a$), the microcomputer determines whether the field current is less than the armature current, block 412. If the field current is less than the armature current, the smallest amount of current resolvable by the analog to digital converter is added to the field control command current, block 414. The minimum resolution available from the A/D converter is approximately 6 amps for a control typically used in a wide range of industrial trucks. This represents 8-bit conversion resolution of 1500 amperes full scale. If the field current is greater than the armature current, the minimal current ($I_d$) resolvable is subtracted from the field current command value, block 416. The microcomputer then reads the armature current again, block 408 and determines if the field current is in equalibrium with the armature current again as shown in block 410. When equilibrium is reached, the microcomputer controls transition from the field transition mode to the field control traction mode, block 418.

D. Field Control Traction Mode

The objective of the field control traction mode is to accelerate the load or maintain velocity of the motor in the field control mode. As contrasted to the motor operating in the series control mode, where the field and armature currents are always identical, in the field control mode, field current is specifically controlled by the mark-space ratio of the chopper circuit. The armature being connected directly across the battery, the armature current is determined by the load conditions and the field strength generated by the field circuit. The mark-space ratio is adjusted by the control circuit to provide the calculated ratio of field current ($I_f$), to armature current ($I_a$). The ratio of ($I_f$) to ($I_a$) is determined by the accelerator position. The maximum or floorboard position yields the minimum field current and the ratio of ($I_f$) to ($I_a$) increases as the accelerator is released. Transition to other modes occurs on the condition which no longer require field control, i.e. selecting the opposite direction of travel, cutting back on the accelerator for a prescribed time period, and/or releasing the accelerator completely.

When the control is in the field traction mode, the mark-space ratio is adjusted so that the ratio of $I_f$ to $I_a$ is a value determined by the accelerator position, in contrast to fixed field weakening resistance elements conventionally used in present practice. A typical control formula is:

$$I_f = [I_a \times (M)]$$

Where (M) equals unity at all accelerator positions less than two-thirds travel, and reduces linearly to a factor such as 0.4 at full accelerator travel. This particular choice of values provides a good general purpose field weakening profile for industrial electric vehicles. It is apparent that other formulas can be applied to accomodate requirements of particular motors and vehicles.

Limits to $I_f$ are also applied. "$I_{max}$" is applied to limit field current to the maximum value allowed by the construction of the motor. "$I_{min}$" is a selectable value to set top motor speed limit and/or where motor commutation limits may be imposed.

Additionally, it is desirable to transfer control back to the series connected mode when the operator demand is lessened, i.e. accelerator dropped back below the two-thirds point. This can be an immediate reversion to the series connected mode or can occur after a time (typically 200 msec) when the accelerator is at the two-thirds point or less. The later action, which includes the time delay, is used if the plug coast mode is enabled in the motor control circuit. The plug coast mode option provides for "engine drag feed" when the accelerator is released by the vehicle operator. The field control mode also exits to the regenerative brake mode upon operator selection of the opposite travel direction regardless of accelerator position.

Figure 7:
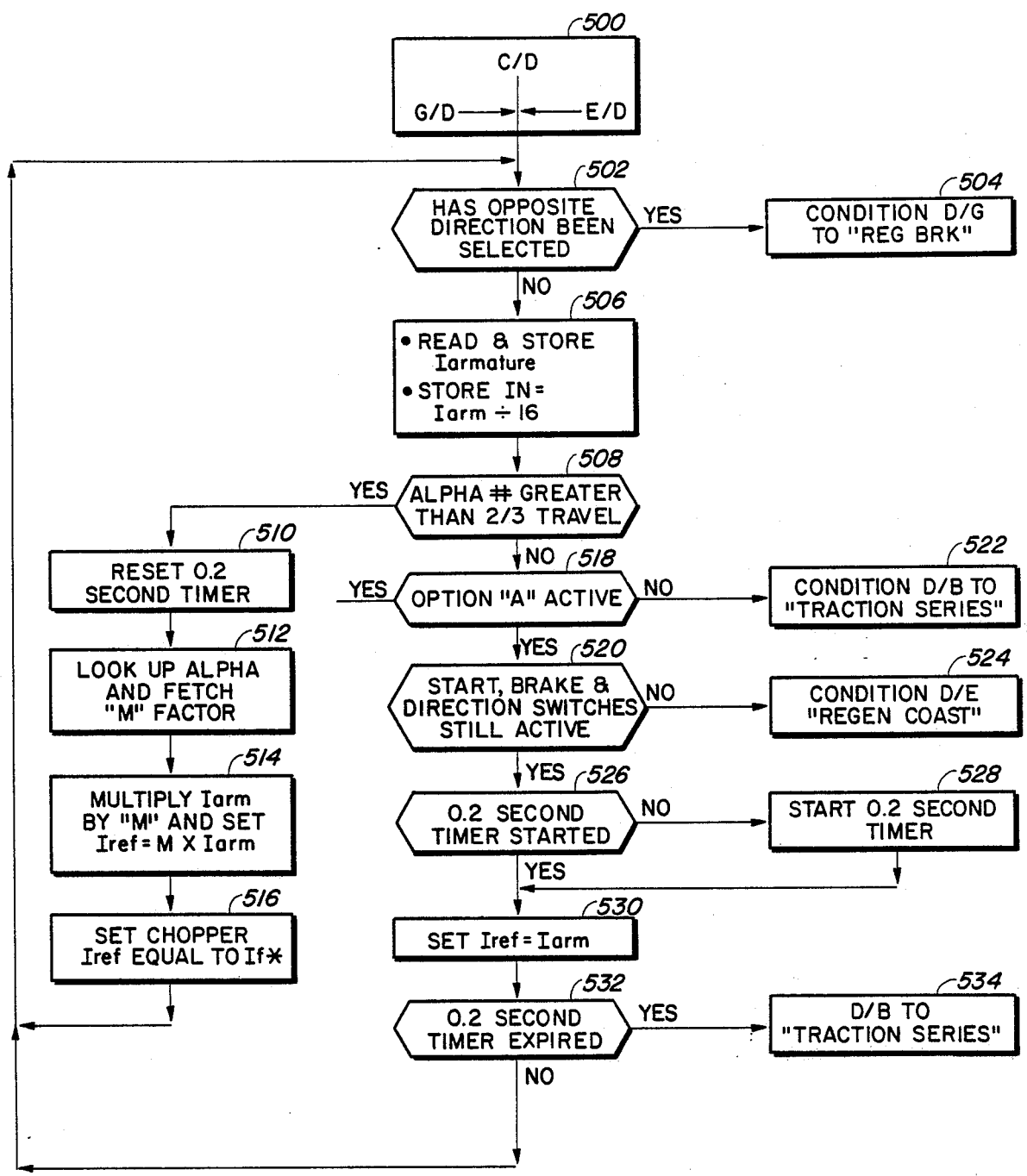
FIG. 7 is a detailed functional diagram of the field control traction mode with selection of commanded field current.

Referring to FIG. 7, there is shown a detailed functional diagram of the field control traction mode. The field control traction mode can be entered from the regenerative brake mode, the field transition mode, and the regenerative coast mode, block 500. In block 502, it is determined whether the operator has selected the opposite direction by shifting the forward/reverse contactors 36 and 38. If the operator has selected the opposite direction, the microcomputer causes a transition to the regenerative brake mode, block 504. If the operator has not selected an opposite direction, the microcomputer reads the armature current ($I_a$) through sensor 24, block 506. In block 506, the microcomputer also reads the accelerator position to determine ALPHA. If ALPHA, the fraction of accelerator travel, is greater than two-thirds travel, the microcomputer exits block 508 and resets a 200 msec timer, block 510.

In blocks 512, 514, and 516 the microcomputer determines the field current command value to operate the motor in the field control tractive mode. This value is calculated by determining the ratio M, as shown in block 512. The determining of the ratio M in calculating ($I_f$) can be implemented in a variety of ways depending on the microcomputer employed and the precision of the field control required. One relatively simple method shown in FIG. 7 is to determine a binary value representing a six percent value of the armature current. This is determined by dividing the armature current by 16 and storing the value ($I_n$) temporarily. Then the accelerator position is examined, and by a table lookup the program finds the number of six percent increments to subtract from the value of ($I_a$) to derive a set point value of ($I_f$). This method provides adequate resolution for controlling most industrial vehicles without an actual hardware divide operation. After determining the value of the field control command current value ($I_f^*$), the microcomputer loops back to determine if the operator has changed direction in block 502.

If ALPHA is less than two-thirds depressed, the microcomputer determines if the plug brake mode is available on this vehicle, block 518. If the plug brake mode is not available the microcomputer causes transition to the series traction mode, block 522. If the plug brake mode is available the microcomputer determines whether the start, brake and direction switches are still active, block 520. If the operator puts the vehicle in neutral or releases the accelerator pedal which opens the start switch, the microcomputer causes transition into the regenerative coast mode, block 524. If the start, brake and direction switches are still active, the microcomputer determines if a 200 msec timer is started, blocks 526 and 528. The microcomputer then sets the set point value for the chopper circuit equal to the armature current, block 530. If the 200 msec timer has expired, block 532, the microcomputer forces a transition to the series control traction mode, block 534. The 200 msec time delay is calculated to prevent a transition from the field control traction mode to the series control traction mode, if the operator hits a bump and momentarily releases pressure upon the accelerator pedal. The time delay prevents the motor from being inadvertently switched from the field control traction mode to the series control traction mode. If the operator reapplies pressure to the accelerator pedal, the system stays in the field control mode and the microcomputer loops back to block 502.

E. Regenerative Coast Mode

The objective of the regenerative coast mode is to create a retarding torque to be applied by increasing field excitation current over that necessary to maintain motor motion in the direction selected and the speed selected by the accelerator. With increased field current, the kinetic energy of the load on the vehicle will cause the armature generator voltage to increase causing charging current to flow back into the battery.

The four electrical braking modes produce different retarding forces. Regenerative coast mode and plug coast mode have less retarding forces respectively than regenerative braking mode and plug braking mode. Regenerative coast mode is less electrical brake in a retarding force than the regenerative brake mode. When the microcomputer switches to the regenerative coast mode, it calls for increase in field current so as to cause armature voltage to rise to drive current in the reverse direction causing the motor to act as a generator to charge a battery.

The level of field excitation is optionally controllable with brake pedal with a coupled position sensor 47. The regenerative coast mode is the only mode in which the brake pedal potentiometer 47 is active. If brake control is not employed, field excitation is adjusted by the chopper circuit to maintain the armature at a fixed selectable value to provide a desired predetermined amount of retard torque. This gives the feeling of engine drag of an internal combustion powered vehicle. The optional brake control will modify the armature current set point to increase the drag over the preselected drag.

The transfer to another mode is determined by a change in directional selection, release of brake, reapplication of accelerator or if the retard torque is continued, by sensing that the armature current cannot be sustained by increasing the field current.

Figure 8:
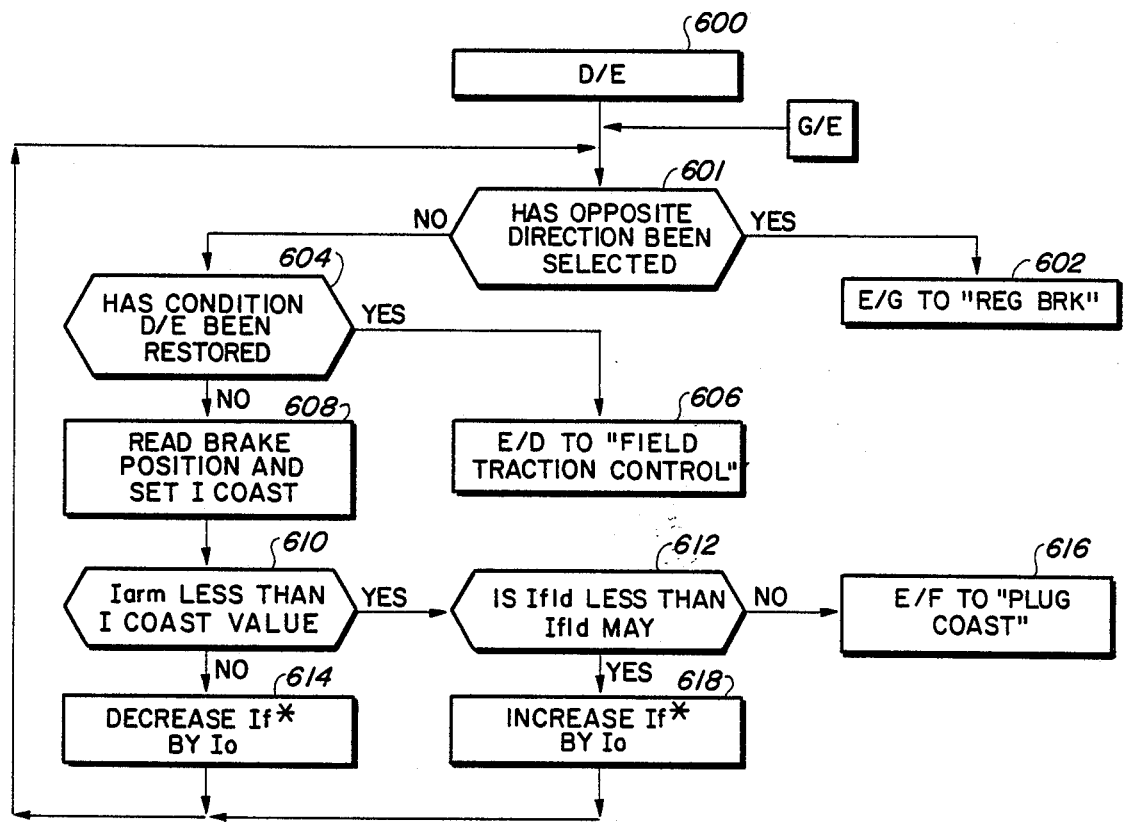
FIG. 8 is a detailed functional diagram of the regenerative coast mode.

Referring to FIG. 8, a detailed diagram of the regenerative coast mode function flow is shown. The regenerative coast mode can be entered from the field traction control mode and the regenerative brake mode, block 600. In block 601, it is determined whether the operator has selected the opposite direction. If the operator has selected the opposite direction, the microcomputer causes transition to the regenerative brake mode, block 602. If the opposite direction has not been selected, the microcomputer resolves whether the start switch is activated and the accelerator has been depressed. In this condition the operator desires to continue operation of the vehicle in the field control traction mode, and the microcomputer causes transition to the field traction mode, block 606. If the operator has not depressed the acceleration pedal, the brake potentiometer 49 provides a signal representative of depression of the brake pedal to the microcomputer, block 608.

As is well known, the voltage developed by the armature is a function of the motor field current and armature rotational velocity and the battery terminal voltage. Accordingly, as vehicle speed is reduced, the ability of the electric motor to regenerate energy is also reduced. At some speed, regeneration must be terminated and some form of plug braking initiated. The motor control system stays in regenerative coast mode as long as the armature current is above a predetermined value, $I_{coast}$, set by the brake potentiometer 47, block 610. When the armature current falls below $I_{coast}$, the microcomputer determines whether the field current is at a maximum available value and the electric vehicle speed is dropped to where the armature cannot be maintained, block 612. At this point, the microcomputer forces a transition of the motor control system to the plug coast mode, block 616.

Basically, under normal braking conditions, as the vehicle slows, the armature current begins to decrease and the field current is increased by the microcomputer to regulate the armature current to a preset limit. In the variable braking option, however, the microcomputer adjusts the regulated value of the armature current depending on the depression of the brake pedal. Thus the field control command current is continuously regulated (by adding the minimum resolvable digital to analog current value $I_d$) until the maximum value of the field current is reached, 618. If the armature current is greater than the braking potentiometer current, the command control field current value is decreased by ($I_d$), block 614. The microcomputer then loops back to the beginning to determine whether the operator has selected an opposite direction in block 601.

F. Plug Coast Mode

The objective of the plug coast mode provides further retarding torque action beyond that available from the regenerative coasting mode. In this mode, the motor is reconnected to a series connection, and the forward-/reverse contactors are switched to opposite sense to that which the vehicle is travelling independent of operator action. The mark-space ratio of the chopper circuit is set to achieve a preselected motor plugging current, typically 200 ampers for an average industrial truck powered from 48 volt batteries.

As the mark-space ratio increases to maintain the coast plugging current, the microcomputer exits the plug coast mode when the mark-space ratio exceeds a preselected value, typically 12 percent for a preselected period of time, typically 100 msec. The time and mark-space ratio are chosen to preclude reverse motion of the vehicle at the termination of the plug coast braking. There are two exit transitions from the plug coast mode, they are to the reset mode and the plug brake mode. Exit transition to the plug brake mode is caused when the operator selects the opposite direction.

Figure 9:
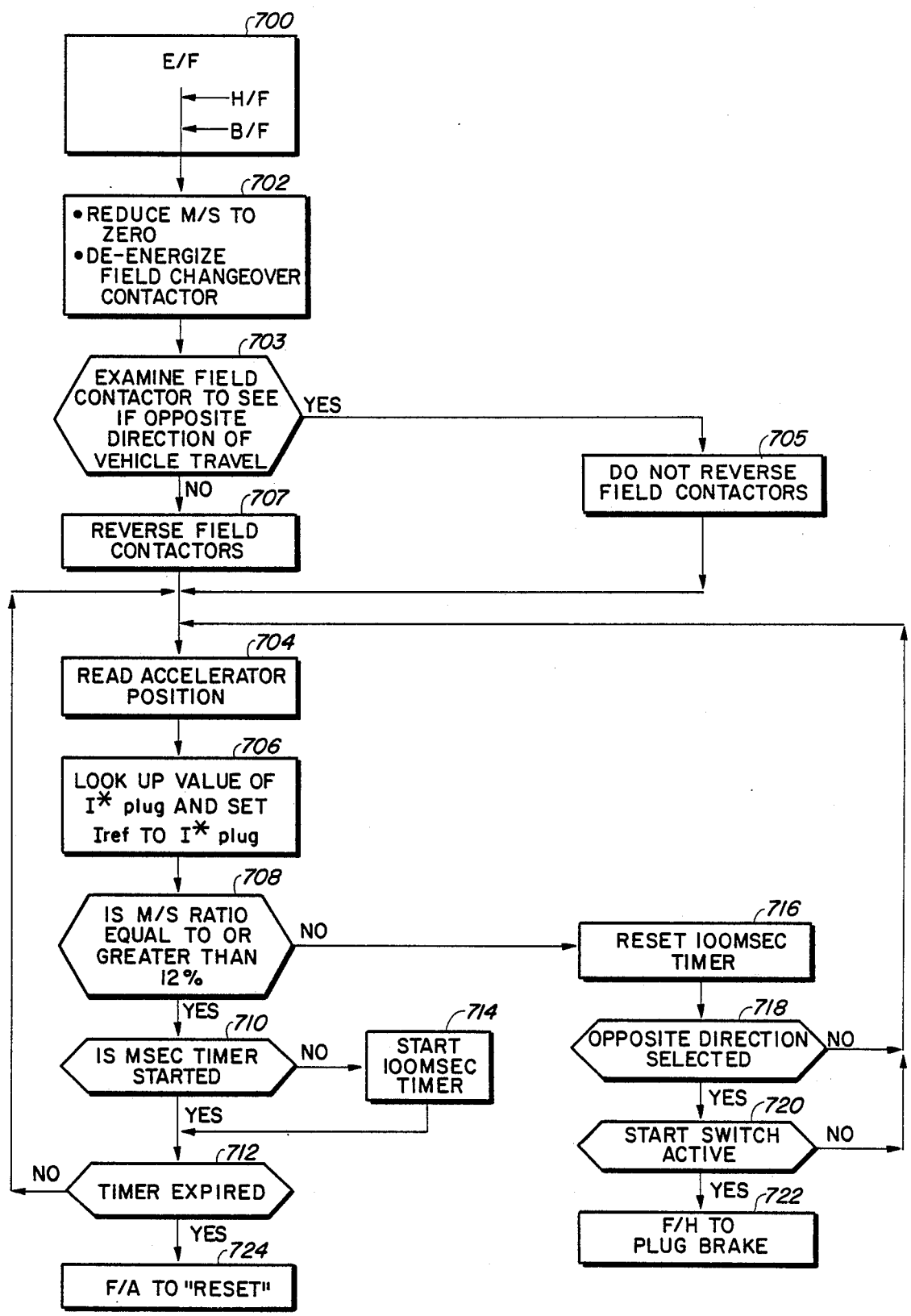
FIG. 9 is a detailed functional diagram of the plug coast mode.

Referring to FIG. 9, there is shown a detailed functional diagram of the plug coast mode. Block 700 shows the transition from the regenerative coast mode, plug brake mode and series control traction mode to the plug coast mode. In block 702, the microcomputer reduces the mark-space ratio to zero for changeover from field control to series control. It also deenergizes the field changeover contactors 42 and 44 to reconnect them in the series mode. The forward/reverse contactors are switched to the opposite sense to which the vehicle is travelling, independent of operator action. Blocks 703, 705 and 707, determine whether the field contactors are in the opposite direction of vehicle travel. If the plug coast mode is entered from the plug brake mode the field contactors are in the correct direction. Therefore the field contactors are not reversed, block 705. Otherwise the field contactors are reversed, block 707.

The microcomputer then senses the accelerator position, block 704. The microcomputer tries to hold the armature current at a predetermined level by increasing the field winding current. The predetermined value of the armature current is determined by a lookup table, block 706. The microcomputer then determines if the mark-space ratio is equal to or greater than 12 percent, block 708. If the mark-space ratio is greater than or equal to 12 percent, the microcomputer starts a 100 msec timer before transition to the reset mode, block 724. The microcomputer activates and checks the 100 msec timer in blocks 710–714. If the timer hasn't expired, the microcomputer repeats reading the accelerator position in block 704.

If the mark-space ratio is less than 12 percent, the 100 msec is reset in block 716. The microcomputer then determines whether the opposite direction is selected by the operator in block 718. If not, the microcomputer then senses the accelerator position again in block 704. If the opposite direction is selected by the operator, the microcomputer determines whether the start switch is activated. If the start switch is tripped, the microcomputer senses the accelerator position, block 704. If the start switch is active, block 720, the microcomputer causes transition to the plug brake mode, block 722. Thus, if the operator selects an opposite direction in the plug coast mode and activates the start switch, the microcomputer causes transition from the plug coast mode to the plug brake mode. If the operator does not select an opposite direction and does not activate the start switch, the microcomputer allows the motor control system to eventually exit to the reset mode, block 724.

G. Regenerative Brake Mode

Figure 10:
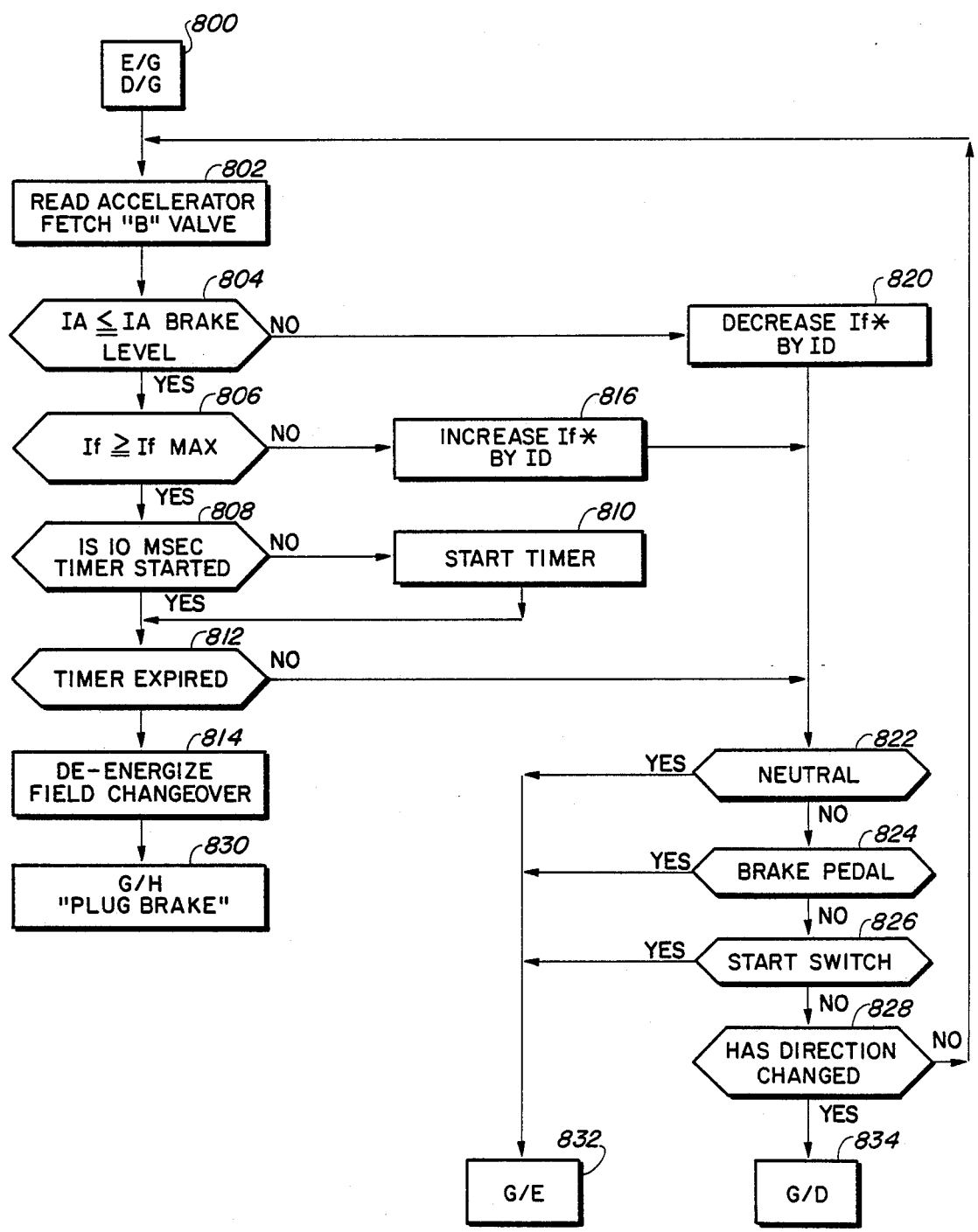
FIG. 10 is a detailed diagram of the regenerative braking mode.

The objective of the regenerative brake mode is to provide strong braking action when the operator selects a direction opposite of that being travelled, in such a way as to recover a portion of the vehicle kinetic energy as a battery charge. Referring to FIG. 10, there is a detailed functional diagram of the regenerative brake mode. The regenerative brake mode can be entered through the regenerative coast mode and the field control transition mode, block 800. The microcomputer then senses the accelerator position and reads the armature brake level through current sensor 24, block 802. In block 804, the actual armature current is compared to the armature brake level. If the actual armature current is less than the armature brake level current, the microcomputer then determines whether the field current is less than the maximum field current. Basically, the microcomputer tries to hold the armature current at a predetermined level by increasing the field winding current. When the field winding current reaches a maximum, the microcomputer then allows the armature current to drop to a lower level for a period of 10 msec and then forces a transition to the plug brake mode, block 830. Blocks 808, 810 and 812 allow the armature current to drop to a lower level for a period of 10 msec. The microcomputer then de-energizes the field contactors for changeover in block 814 and forces a transition to the plug brake mode in block 830.

If the 10 msec timer has not timed out in block 812, the microcomputer checks to see if the operator has placed the vehicle into neutral, block 822. If the operator places the vehicle into neutral, the microcomputer forces a transition to the regenerative coast mode, block 832. If the operator has not placed the vehicle into neutral, the microcomputer determines whether the brake pedal is depressed. If the brake pedal is depressed, block 824, the microcomputer forces a transition to the regenerative coast mode, block 832. If the brake pedal is not pushed, the microcomputer determines whether the operator has taken his foot off the accelerator by sensing the start switch, block 826. If the operator has taken his foot off the accelerator, the microcomputer forces a transition to the regenerative coast mode, block 832. If the operator has not taken his foot off the accelerator, the microcomputer resolves whether the operator has changed directions in block 828. This signifies that the operator has changed back to the original direction, since a direction change is necessary to force a transition to the regenerative brake mode originally. If the operator has not forced a transition back to the original direction, the loop repeats over starting at block 802. If the direction is changed, the microcomputer forces a transition to the field control traction mode 834.

Referring back to block 804, if the actual armature current is not less than the armature brake level, the field command control value is decreased by the minimal resolution analog to digital converter value ($I_d$), block 820. The microcomputer then transfers to block 822. Referring back to block 806, if the field current is not greater than the maximum field current, the command field control value is increased by the minimum resolution current value ($I_d$), block 816. The microcomputer then continues at block 822 as described before.

To summarize briefly the regenerative brake mode, The microcomputer tries to hold the armature current at a predetermined level by increasing the field winding current. When the field winding current reaches a maximum, the microcomputer then allows armature to drop to a lower level for a period for a period of 10 msec and then forces a transition to the plug brake mode. Upon the determination that a direction change has been selected by the operator the microcomputer causes a transition to the field control traction mode. If the operator has selected neutral or depressed the brake pedal or taken his foot off the accelerator, the microcomputer forces a transition to the regenerative coast mode.

H. Plug Brake Mode

Figure 11:
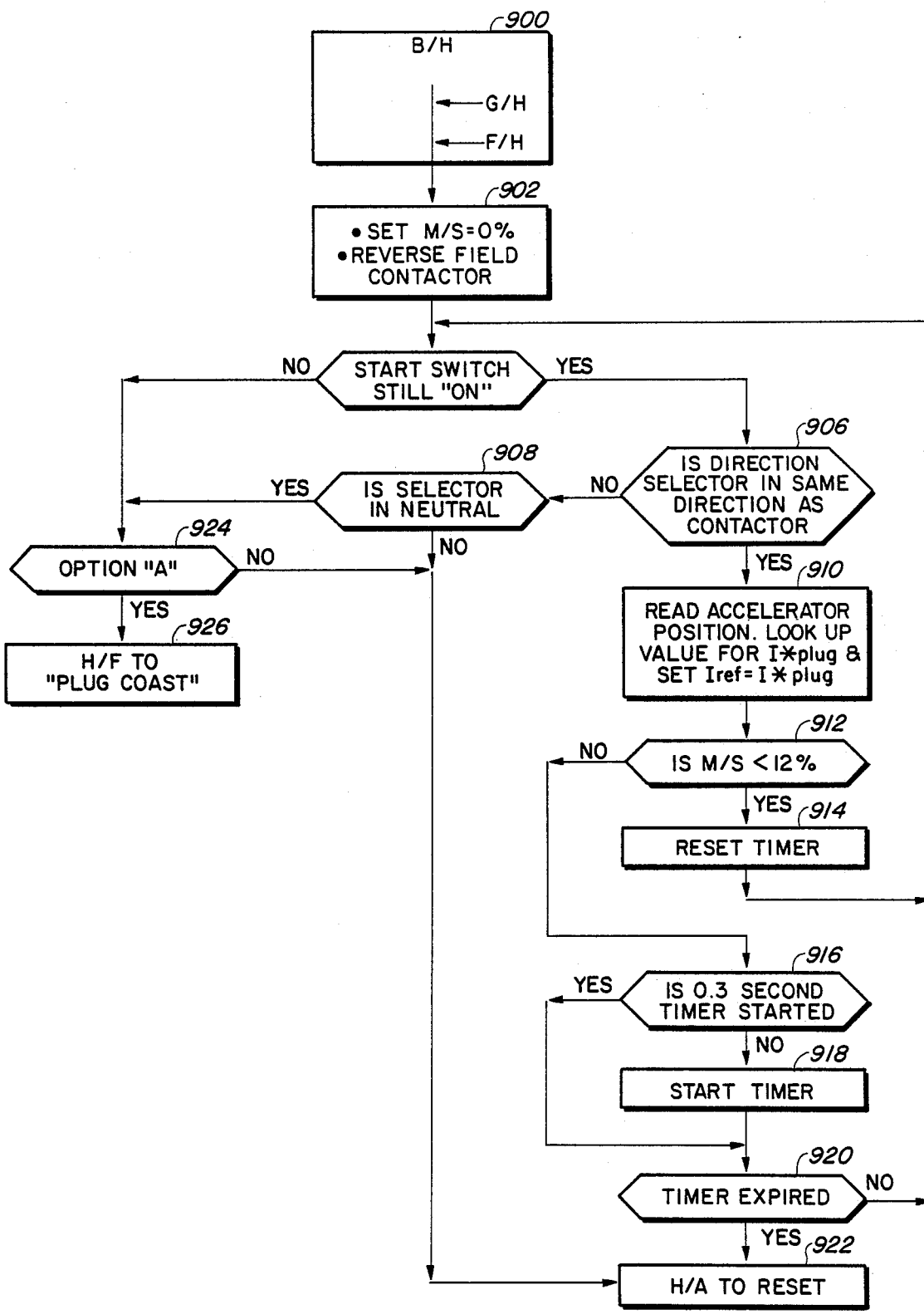
FIG. 11 is a detailed functional diagram of the plug brake mode.

The objective of the plug brake mode is to provide a strong braking action when the operator selects a direction opposite to that being travelled, with the intention to reduce vehicle speed to zero and ultimately to reaccelerate in the opposite direction. Referring to FIG. 11, there is shown a detailed function diagram of the plug brake mode. The plug brake mode is entered from the plug coast mode, regenerative brake mode, and the series control traction mode, block 900. In the plug brake mode, the microcomputer sets the mark-space ratio of the control chopper to zero percent and reverses the field contactors selected by the operator for changeover, block 902. The microcomputer then determines whether the start switch is still on, block 904. If the start switch is still on it is resolved whether the direction selector is in the same direction as the contactor, block 906. If the inquiry to block 906 is positive, the microcomputer reads the accelerator position and determines a predetermined value in a lookup table for tha armature current, block 910. The microcomputer sends the value to the mark-space ratio unit to control field current. The microcomputer then determines whether the mark-space ratio is less than 12 percent. If the mark-space ratio is less than 12 percent a 300 msec timer is reset, block 914. If the mark-space ratio is not less than 12 percent, a 300 msec timer is started as shown in blocks 916 and 918. Basically, the motor control system will stay in the plug brake mode until the mark-space ratio is greater than or equal to 12 percent for 300 msec. If the system stays in this mode for 300 msec, the microcomputer forces transition from the plug brake mode to the reset mode, block 922.

Referring to block 904, if the start switch is not on and the plug coast mode is available, the microcomputer forces transition to the plug coast mode, block 926. This signifies that the operator desires to coast using plug braking. If the operator reverses the direction of the vehicle and depresses the accelerator to increase the retarding force, the motor control circuity stays in the plug brake mode. Referring to block 906, if the direction selector is not in the same position as the contactor, the microcomputer determines whether the direction selector is in the neutral position as shown in block 908. If the selector is not in the neutral position, the microcomputer forces transition to the reset mode, block 922. If the selector is set in the neutral position and the plug coast option is available, the microcomputer forces a transition to the plug coast mode, block 926.

It will be appreciated that what has been described in a motor control system which implements various degrees in forms of electrical braking in order to optimize performance in response of electrical vehicle. The system includes a method and apparatus for providing a feel to the vehicle operation which emulates an internal combustion vehicle. While the system is described in what is considered to be a preferred embodiment, other modifications and variations would become apparent to those skilled in the art. It is intended, therefore, that the appended claims not be limited to this specific embodiment; but be interpreted within the spirit and scope of the invention.

We claim:

1. An operating method for use in a control system for an electrically driven vehicle for implementing operation in a propulsion mode, a coast mode and an electrical brake mode, said coast mode being distinct from a plug braking mode and simulating the retarding effects of an internal combustion engine driven vehicle, the vehicle being powered by a direct current electric traction motor having an armature and a field winding and including: a power source; a variable mark-space ratio power regulator responsive to a motor current command signal for connecting the power source to the motor in a manner to regulate motor current in the armature and field winding and wherein the current command signal is developed in response to the position of an accelerator; a direction selection means for providing signals indicative of a desired direction of motion of the vehicle; and signal processing means responsive to said selection means signal and to the accelerator position and mark-space ratio for establishing the mode of operation of the motor; said method comprising the steps of:

(a) receiving data indicative of movement of the accelerator from a rest position and a selected direction of motion of the vehicle;

(b) establishing a mark-space ratio for the regulator responsive to accelerator position for establishing operation in the propulsion mode;

(c) sensing data representative of return of the accelerator to a rest position; and (d) transitioning the motor operation to the coast mode in response to return of the accelerator to the rest position.

2. The method of claim 1, wherein the signal processing means comprises a microcomputer having a central processing unit operable according to a stored program of instructions for directing the central processing unit to generate command signals for effecting switching between modes of operation, further comprising the steps of:

(f) sensing the mark-space ratio of the regulator; and (g) selecting automatically between a series propulsion mode and a separately excited propulsion mode of operation for the motor based upon the position of the accelerator and the mark-space ratio.

3. The method of claim 2 wherein the signal processing means selects a plug coast mode and a regenerative coast mode as a function of the selected series and separately excited propulsion modes.

4. The method of claim 3, wherein the vehicle includes a brake pedal for controlling braking effort, the method including the steps of:

(h) sensing data representative of movement of the brake pedal from a rest position; and (i) setting the magnitude of electrical regenerative coast current in response to brake pedal position.

5. The method of claim 2 wherein the electrical brake mode includes a regenerative braking mode and a plug braking mode, further comprising the steps of:

(j) transferring to a regenerative braking mode when an opposite direction of vehicle motion is selected;

(k) regulating current in the armature of the motor by controlling current in the motor field winding; and (l) switching to a plug braking mode when the armature current cannot be maintained at a desired regulated value.

6. The method of claim 5 during which the vehicle is operated in a regenerative braking mode, further comprising the steps of:

(m) sensing data representative of the position of the accelerator; and (n) transferring to the separately excited propulsion mode when the accelerator is moved from the rest position.

7. The method of claim 5, further comprising the step of:

(o) setting the desired regulated value of armature current in response to accelerator position.

8. The method of claim 4, further comprising the steps of:

(r) sensing data, the data including the brake pedal position, the direction selection means in a neutral position and the accelerator at the rest position; and (s) switching to a regenerative coast mode from a separately excited propulsion mode wherein electrical coast retard is a function of brake position.

9. The method of claim 8, further comprising the step of switching to a regenerative brake mode when the direction selection means is actuated to select a direction opposite to the direction of motion of the vehicle.

10. The method of claim 2, further comprising the steps of:

(t) sensing data from the direction selection means representative of the selection of the opposite direction of vehicle motion; and (u) automatically selecting a plug braking mode when the vehicle is in a series propulsion mode.

11. The method of claim 10, wherein the step (u), of selecting further comprises the steps of:

(v) maintaining the motor in a plug braking mode until the mark-space ratio of the power regulator rises above a preselected limit; and (w) switching thereafter to a deenergized mode for the motor.

12. The method of claim 2, further comprising the step of selecting a plug coast mode upon return of the accelerator to a rest position when the motor is in a series propulsion mode and the markspace ratio is at least a predetermined minimum value.

13. The method of claim 12, further comprising the step of switching to a de-energized mode when the mark-space ratio is greater than the predetermined minimum value.

14. The method of claim 5, wherein the accelerator pedal comprises a variable braking means for generating input to the microcomputer representative of the position of the accelerator pedal, wherein the step (k) of regulating further comprises the steps of:

providing data representative of accelerator position;

adjusting the regulated value of the armature current as a function of the accelerator position;

maintaining the motor in a regenerative braking mode until the armature current cannot be maintained without exceeding a field winding current limit; and switching thereafter to a plug brake mode for the motor.

15. The method of claim 14, further comprising the steps of:

raising the regulated value of the armature current in response to an operator positioning the accelerator pedal for a greater retarding force; and lowering the regulated value of the armature current in response to an operator positioning the accelerator pedal for less retarding force.

16. The method of claim 4 and including the further steps of:

maintaining the motor in a regenerative coast mode until motor armature cannot be maintained without exceeding a predetermined field winding current limit; and switching thereafter to a plug coast mode for the motor.

17. The method of claim 16 further comprising the steps of:

raising the regulated value of the armature current in response to an operator positioning the brake pedal for a greater retarding force; and lowering the regulated value of the armature current in response to an operator positioning the brake pedal for less retarding force.

18. A method for braking an operator controlled electric traction motor propelled vehicle of the type including, a power source, a time-ratio power regulator which is controlled to be conducting and non-conducting for connecting and disconnecting the motor to a direct-current power source in response to the relative position of an accelerator, a direction positioning means for controlling the direction of the vehicle, a signal processing means for controlling switching means, the switching means controlling the operation of the motor, a sensing means for providing signals representative of currents within field and armature windings of the motor, a braking means for providing signals representative of a brake position, said method comprising the steps of:
- (a) receiving data, the data including the position of the accelerator, the direction of motion of the vehicle, and the conducting and nonconducting time ratio interval;
- (b) setting the switching means in response to the position of the accelerator and the selected direction of motion of the vehicle; and
- (c) changing the switching means in response to release of the accelerator for implementing a first relatively low level of electrical braking of the vehicle distinct from a plug braking mode.

19. The method of claim 18, wherein the first level of electrical braking provides a predetermined retarding drag characteristic simulative of an internal combustion engine drag characteristic.

20. The method of claim 19 wherein the electrical braking is selected from a regenerative braking mode and a plug braking mode in dependence upon the conducting and non-conductive time ratio interval of the power regulator.

21. The method of claim 20 wherein the electrical braking in the regenerative braking mode is variable in dependence upon positioning of a brake control means.

22. The method of claim 18 and including the further steps of:
sensing a change in the selected direction of motion of the vehicle; and
transitioning to a second relatively stronger level of electrical braking in response to the sensed change.

23. In a control system for a direct current traction motor having armature and field windings, the control system being of the type including a variable mark-space ratio power regulator, an accelerator and signal processing means responsive to accelerator position for supplying current command signals to the regulator, switching means for establishing connection of the motor in one of a series propulsion mode and a separately excited propulsion mode, the switching means being operated by the signal processing means in response to predetermined desired operating characteristics of the motor, and a power source, a method for switching between the series mode and separately excited mode comprising the steps of:
- (a) sensing the mark-space ratio of the regulator;
- (b) transitioning from a series mode to a separately excited mode when the mark-space ratio exceeds a predetermined value;
- (c) determining the magnitude of motor current just prior to transitioning; and
- (d) increasing the magnitude of field current above the determined magnitude of motor current immediately after transitioning whereby the magnitude of armature current is prevented from increasing above a determined magnitude at the time of transitioning.

24. The method of claim 23 wherein the field current magnitude is increased in accordance with the following relationship:

$$I_{f(t)}I_{fm}-[(I_{fm}-I_{f(to-)})\times(e)\exp(-t/T_f)]$$

where $I_{f(t)}$ equals field current as a function of time (t), $I_{fm}$ equals power source voltage multiplied by a selected mark-space ratio divided by resistance of the field winding, $I_{f(to-)}$ equals field current value just prior to transitioning and $T_F$ is the field winding time constant, wherein the mark-space ratio is selected to produce a value of $I_{fm}$ which is at least five percent greater than $I_{f(to-)}$.

25. The method of claim 23 wherein the magnitude of armature current is regulated by control of field current, the accelerator position setting the ratio of field current to armature current.

26. The method of claim 25 and including the further steps of:
sensing return of the accelerator to a rest position; and
transitioning to a first level of electrical braking in response to the sensed return.

27. The method of claim 26 wherein the first level of electrical braking is implemented in a plug braking mode when the transition occurs from a series connected propulsion mode and is implemented in a regenerative mode when the transition occurs from a separately excited propulsion mode.

28. The method of claim 27 and including the further steps of:
sensing, in the regenerative mode, when the field current cannot be adjusted to maintain armature current at a desired value without exceeding a field current limit; and
switching to the plug braking mode in response thereto.

29. The method of claim 28 and including the further steps of:
- (a) detecting direction selection change; and
- (b) initiating elctrical braking at a second stronger level in response to the direction change.

30. The method of claim 29 wherein the mode of electrical braking is selected in dependence upon the connection of the motor in one of a series mode and separately excited mode.

* * * * *